United States Patent
Gleave et al.

(10) Patent No.: US 11,334,563 B1
(45) Date of Patent: May 17, 2022

(54) SYSTEM AND METHOD FOR AUTOMATIC EVALUATION OF PROJECT MANAGEMENT TICKETS

(71) Applicant: F3Systems Ltd., London (GB)

(72) Inventors: Gavin Gleave, London (GB); James Keyworth, London (GB); Kyle Nash, London (GB)

(73) Assignee: F3 Systems Ltd., London (GB)

( * ) Notice: Subject to any disclaimer, the term of this patent is extended or adjusted under 35 U.S.C. 154(b) by 0 days.

(21) Appl. No.: 17/230,707

(22) Filed: Apr. 14, 2021

Related U.S. Application Data

(60) Provisional application No. 63/168,782, filed on Mar. 31, 2021.

(51) Int. Cl.
  *G06F 16/242* (2019.01)
  *G06F 16/25* (2019.01)
  *G06F 16/28* (2019.01)
  *G06F 16/23* (2019.01)

(52) U.S. Cl.
  CPC ........ *G06F 16/2425* (2019.01); *G06F 16/235* (2019.01); *G06F 16/2445* (2019.01); *G06F 16/252* (2019.01); *G06F 16/284* (2019.01)

(58) Field of Classification Search
  CPC ............ G06F 16/2425; G06F 16/2445; G06F 16/284; G06F 16/252; G06F 16/235
  See application file for complete search history.

(56) References Cited

U.S. PATENT DOCUMENTS

| | | | |
|---|---|---|---|
| 7,437,614 B2 * | 10/2008 | Haswell | G06F 11/3684 714/38.13 |
| 7,752,197 B2 * | 7/2010 | Dettinger | G06F 16/284 707/721 |
| 8,126,760 B2 * | 2/2012 | Kelly | G06Q 10/0633 705/7.27 |
| 10,296,187 B1 * | 5/2019 | Gregg | G06F 3/04842 |
| 2003/0005110 A1 * | 1/2003 | Corbin | G06F 11/324 709/224 |
| 2004/0078373 A1 * | 4/2004 | Ghoneimy | G06Q 10/10 |
| 2010/0107095 A1 * | 4/2010 | Singh | G06F 3/048 715/764 |
| 2011/0047176 A1 * | 2/2011 | Hoffman | G16H 50/20 707/769 |
| 2011/0083138 A1 * | 4/2011 | Sivasubramanian | G06F 16/284 719/328 |
| 2012/0078967 A1 * | 3/2012 | Hagan | G06F 16/252 707/792 |
| 2014/0075410 A1 * | 3/2014 | Wolfram | G06F 3/01 717/106 |
| 2015/0199399 A1 * | 7/2015 | Schroetel | G06F 16/2423 707/767 |
| 2018/0247084 A1 * | 8/2018 | Smith | H04L 9/0894 |
| 2019/0102465 A1 * | 4/2019 | Yang | G06F 16/9537 |
| 2019/0129734 A1 * | 5/2019 | Yang | G06F 9/44526 |

* cited by examiner

*Primary Examiner* — Pierre M Vital
*Assistant Examiner* — Zuheir A Mheir
(74) *Attorney, Agent, or Firm* — Ted Sabety; Sabety + associates, PLLC

(57) ABSTRACT

A method and system for computer processes and data structures is described that define an environment for monitoring tasks that together constitute a project, where such processes utilize a scripting language to define certain functions that may relate data from one part of a project to another.

16 Claims, 10 Drawing Sheets

201

202

203

SYSTEM AND METHOD FOR AUTOMATIC EVALUATION OF PROJECT MANAGEMENT TICKETS

PRIORITY CLAIM

This is a utility patent application that claims the benefit of U.S. Prov. Pat. App. No. 63/168,782 filed on Mar. 31, 2021. This application hereby incorporates by reference the patent application titled "SYSTEM AND METHOD FOR TRACKING PROJECT TASKS IN REAL TIME" filed on Mar. 31, 2021 as U.S. Prov. App. No. 63/168,761 and the continuing utility application, U.S. patent application Ser. No. 17/230,629 filed on Apr. 14, 2021, for all that they teach.

FIELD OF INVENTION

This invention relates to computer processes and data structures that define an environment for monitoring tasks that together constitute a project, where such processes utilize a scripting language to define certain functions that may relate data from one part of a project to another.

BACKGROUND

In one example application, the project may be the construction of a building. To construct a building, many tasks must be completed. The inter connection of these task processes can quickly become highly complex, and even more so if there is more than one project. That complexity may be addressed by automating processes that monitor and maintain data structures that represent the constituent tasks of the project. Automating such processes can be accomplished using a computer language to define scripts that wait on or are activated by data structures entering certain logic states. Therefore, there is a need for a computer scripting language and its related processes and protocols to automate the processing of data structures representing the tasks in a project. The scripting functionality is referred to as "pulsar".

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Pulsar

The invention is a unique DSL (Domain specific language), which allows a user to automatically run formulas on data derived from data objects comprising a project. The language and its operational function is referred to as "pulsar." These data structures may be referred to as "tickets", which is an instance or submission of a defined form that comprises the project. The expression of formulas are then executed on the data comprising the ticket as it's the ticket that contains the data describing the specific instance of the task. Applicant hereby incorporates by reference its patent application titled "SYSTEM AND METHOD FOR TRACKING PROJECT TASKS IN REAL TIME" filed on Mar. 31, 2021 as U.S. Prov. App. No. 63/168,761 and the continuing utility application, U.S. patent application Ser. No. 17/230,629 filed on Apr. 14, 2021, for all that they teach. The data structure for a project or a data structure defining a form can contain either a reference to or the components of a script that can be executed against the data comprising an instance of a project data structure or form data structure.

Figure 10:

This is very powerful and allows the user to retrieve and manipulate data across the system. Preferably, the invention is used to retrieve data from linked forms. At a very high level, the invention accepts an object and a proper formula. The formula can then reference fields within that object. An example of an object may look like FIG. 10. From that object the system can execute pre-defined formulas against it. For example if the user wanted to get the creators name the invention can run the following formula and the output will return "John Doe":

ticket.creator.name

In a preferred embodiment, the user can also define and run functions within invention that allows user to manipulate the data. For example, if the user wanted a defined formula to concatenate the ticket creators name with their organization then the invention could run the following formula. The expected output from this formula would be "John Doe (fu3e limited.)" CONCAT(ticket.creator.name, '(', ticket.creator.organisation.name, ')')

An object can also contain an array of items. In the invention this is defined by the label ManyRefs. When the object contains a manyref, the user is then able to run special functions that either aggregates the data or filters the data in a specific way. In the example of the object, the "child: line_items" key will be treated as a ManyRef. In this embodiment, the user has several aggregation functions it can use on ManyRef objects, one of them being the "SUM" function and in the following example the invention will get the total "price" of the "child:line_items", the expected output will be 700

SUM(ticket.child:line_items, 'price')

Interpreter

Interpreters take expressions and calculate their actual PHP value. Each expression has its own interpret function, which takes the interpreter context class as a parameter and an extra parameter function In this way, each expression interprets itself, and places its interpreted value on the context that was passed in as the first parameter. For instance, an IntegerExpression class will have an interpret function associated with it. If the value of an expression was '3' as extracted from the script, it will run the replace function on the context class it was passed with its own key as the first parameter, and '3' as the final interpreted value. This means the context now knows what the real value of this expression is, and other expressions can access this using the lookup function.

Parser

The parser reads the script string and transforms it into an object code module.

Pulsar Object Code

The parsed object code is also known as "pulsar" script and is represented as objects.

Expression

An expression is a token or set of tokens that can be interpreted. For example, 3 is an IntegerExpression, and 3+2 would be an Addition Expression comprised of two integer expressions.

Function. The invention is embodied in a set of at least a range functions that perform a corresponding set of tasks related to managing a project represented by a set of data structures.

AND Function

The And function returns a Boolean data value of either true or false, it accepts an unlimited amount of parameters and if all the conditions are true and then the formula will return true. These are examples of when the formulas will return true and false AND(1=1, (1+1)=2)//returns true
AND(1=1, (1+1)=5)//returns false AVERAGE Function The Average function gets the average value of a field within a ManyRef. The function has 2 mandatory parameters and one optional. The first parameter is the ManyRef object the user is referencing. The second parameter is the field that the user wishes to average and finally the final parameter is an anonymous function which can be used to filter the records to be averaged.

The following example averages the order_value of the child form "orders"

AVERAGE (ticket.child:orders, 'order_value')

CEIL Function

The Ceil function simply rounds up a number to the next whole number, or to the amount of decimal places specified in the 2nd parameters CEIL (1.01)//returns 2
CEIL (1.01, 1)//returns 1.1

CONCAT Function

The Concat function simply concatenates multiple strings together, for example:

CONCAT ("HELLO", "WORLD")//returns "HELLO WORLD"

COUNT Function

The Count function accepts 2 parameters, the first parameter being a ManyRef and the second parameter being an optional anonymous function.

The following example will count the number of "Risks" linked to the ticket COUNT(ticket.child:risks)

DATE Function

The Date function accepts a date and then turns it into a date object which can then be used by the other date functions. The following example will create a date object from a string

DATE ("01/01/2021"))

DAYADD Function

The DAYADD function accepts 2 parameters, one being a date object and the other is the number of days the user wants to add to the date.

In one example, if a user adds a day onto todays date. For example: 01/01/2021

DAYADD(TODAY( ), 1)//01/02/2021

DAYDIFF Function

Daydiff calculates the amount of days between 2 dates, for example DAYDIFF(today( ), DATEADD(today( ), 1))// returns 1

DAYSUB Function

The Daysub function accepts 2 parameters, one being a date object and the other is the number of days the user wants to take away from the date.

In the following example is one day back from today's date. The invention assumes todays date is 01/02/2021

DAYSUB(TODAY( ), 1)//01/01/2021

FIRST Function

The first function retrieves the specified value from the first record from a ManyRef object. The function accepts 3 parameters. The first parameter is the fqp to the ManyRef object, the second parameter is the field that the user wishes to retrieve from the record and finally the optional and third parameter is an anonymous function to filter the results.

In the following example, the invention will get the "invoice_total" field from latest "ticket.child:invoice" form where the status is "Paid"

LATEST (ticket.child:invoice, 'invoice_total', {! item.status='Paid'})

FLOOR Function

The floor function simply rounds down a number to the previous whole number, or to the amount of decimal places specified in the 2nd parameters FLOOR (1.01)//returns 1
FLOOR (1.11, 1)//returns 1.1

GROUP_CONCAT Function

This function allows the user to group concatenate values from a ManyRef object. For example a form may have an associate link to another form and the user may want to concatenate all the linked ticket references together. The function accepts 3 parameters, the first being the ManyRef object, the second is the FQP inside of that object that the user wants to concatenate and finally the last parameter is an anonymous function. Currently all values are separated by a comma, this can not currently be changed with another separator.

The follow example shows how a user will concatenate the full_reference field of linked forms GROUP_CONCAT (ticket.associate: linked_form, 'full_reference')

HYPERLINK Function

This function allows the user to output a hyperlink using a pulsar formula. The first parameter is the url of the hyperlink, the second parameter is the text to be shown in the link and finally the third parameter is the target type of the hyperlink. The target type supports any of the target types on a html href link https://www.w3schools.com/tags/att_a_target.asp The follow example will display a link to google HYPERLINK ('http://google.com', 'Google', '_target')

IF Function

The if function checks a condition and then depending whether that condition is true or false it will then return the specified value. In the following example, the invention will check if the project status is live and if so the invention will then output the text "Project is live" otherwise the output will be "Project is not live"

IF(ticket.project.status='Live', 'Project is live', 'Project is not live')

INCLUDES Function

This function takes two parameters. The first parameter is a variable which must be a custom field data type of multi select dropdown. The second parameter is the value the user wants to search for. The function will return true if the value has been selected in the dropdown or false otherwise.

INCLUDES(ticket.drop_down, 'Value A')

This function takes 1 parameter and returns true or false depending on whether the parameter resolves to be empty ISBLANK(ticket.description')

LATEST Function

This function takes two or three parameters, the first parameter is the ManyRef the user wishes to get the value from, the second parameter is the field the user wants to retrieve from the ManyRef and the final parameter is an anonymous function which allows the user to filter out the results.

In the following example, the script will determine the latest invoice number from invoice child form LATEST(ticket.child:invoices, 'invoice_number')

LEFT Function

This function retrieves the first amount of characters of the given string, the first parameter accepts a string and the second parameter is the amount of characters the user wishes to take In the following example, the invention obtains the first 5 characters from the string 'Hello world' LEFT('Hello World', 5)//Returns "Hello"

MAX Function

This function retrieves the maximum value from a many ref. This function takes two or three parameters, the first parameter is the many reference the users wishes to get the value from, the second parameter is the field the user wants to retrieve from the many ref and the final parameter is an anonymous function which allows the user to filter out the results.

In the following example, the script determines the maximum invoice total from the invoices that are related to the current ticket MAX(ticket.children:invoices, 'invoice_total')

MIN Function

This function retrieves the minimum value from a many ref. This function takes two or three parameters, the first parameter is the ManyRef the user wishes to get the value from, the second parameter is the field the user wants to retrieve from the many ref and the final parameter is an anonymous function which allows the user to filter out the results.

In the following example, the script will get the minimum invoice total from the invoices that are related to the current ticket MIN(ticket.children:invoices, 'invoice_total')

MONTHDIFF Function

This function takes 2 date parameters and returns the number of months difference between the dates. The following example will show the month difference between the 2 dates MONTHDIFF(today( ), DATEADD(today( ), 31))//returns 1

MONTHNAME Function

Takes a date parameter and returns the month name of that date.

MONTHNAME(DATE('01/01/2021'))//returns "January"

NOT Function

Takes one parameter and reverses true to be false and vice versa. In the following example the invention will reverse the value of true to false NOT(true)//returns false OR Function This function takes as many parameters as the user likes with a minimum of two. If at least one parameter resolves to be true then the return value will be true, if all are false then it will return false OR (1=1, 1=2)//returns true AND(1=2, 3=1)//returns false RIGHT Function Gets the last amount of characters of the given string, the first parameter accepts a string and the second parameter is the amount of characters the user wishes to take In the following example, the invention obtains the last 5 characters from the string 'Hello world'

RIGHT ('Hello World', 5)//Returns "World"

ROUND Function

This function takes three parameters. The first parameter is a value the user wants to round (can be a number or an expression i.e. a variable, formula etc), second optional parameter is the amount of decimal places to round to (default 0), third optional parameter is whether to round up or down (default to up, available parameter values: "up", "down")

ROUND (1.5)//Returns 2

ROUND (1.49, 2)//Returns 1.50

SUM Function

This function takes two or three parameters. The first parameter is a variable which must be a custom field data type of ManyRef. The second parameter is the field the user wants to sum up. The third optional parameter is a pulsar formula to filter the results with format {!formula} if the third parameter resolves to be true then the item is added. The return values is a sum of the second parameter.

In the following example the invention will sum all the invoice values together

SUM(ticket.child:invoices, 'invoice_total')

TODAY Function

Gets and returns todays date as a date object, this then allows the invention to use the date manipulation functions on the date. On the example the invention will assume todays date is 01/01/2021

TODAY( )//Returns 01/01/2021

Year Function

Takes a date parameter and returns the year from that date. On the example the invention will assume today's date is 01/01/2021

YEAR(TODAY( ))//Returns 2021

Anonymous Functions

An anonymous function is something that is compiled at runtime which the result can be used by a function.

A good example of this is if the user wanted to sum up the value of the order_value of some child tickets, but the user wanted to only include child tickets with a certain status, the user could use an anonymous function to define the conditions which would include a child ticket in that sum.

Please Note: The user can't have anonymous functions nested

Also: If the user references 'item.' inside the anonymous function, the user is referencing the runtime interpreted ticket. If the user references 'ticket.' inside the anonymous function, the user is referencing the main ticket.

Example of this: SUM(ticket.parent:form_1.children: form_2, 'order_value', {!AND(item.status='APPROVED', ticket.status < > item.status)})

The above example would Sum the order value of all children of this ticket's parents where the parent is form 1 and the child of that parent is form 2, however it will only do this is the anonymous function evaluates to true, which checks that the child ticket status is approved.

Expressions

Expressions are the backbone of how the scripts defined in accordance with the invention are interpreted. When a script is parsed, it is formed into a set of expressions which the parser then processes. Expressions are simply classes which can be given a set of data that make up a piece of Pulsar code (e.g., '1', '+' and '2' for example) and resolve a result from that (i.e. 3). This means that expressions interpretation can be kept entirely separated, meaning if a user wanted to add a new feature to Pulsar, they could easily add an expression which will resolve the value. Expressions can be made up of other expressions, and the way this usually works is that it would resolve the value of its sub expressions to use for its own value it needs to resolve. A good example of this is the AdditionExpression under common\pulsarExpress\interpreter\expressions\math; This expression in its constructor takes two arguments—a left expression, and a right expression. To resolve the value, it first asks the left and right expressions to resolve. When these expressions resolve, they are put onto what is called the InterpreterContext, which is basically where all resolved values end up after being calculated.

It then takes these left and right resolved values and adds them together, putting this calculation onto the interpreter context.

A beneficial aspect about the interpreter context is that the invention now has a value that is accessible by any expressions that decide to use this addition express—the final sum value, and the invention also has the left and right expression values on the context. This is very powerful as it allows any expression to know the final value of another expression.

The other thing to point out about these expressions is that since they interpret themselves through a consistent API, the user can replace certain expressions with other ones and things will still work.

In the addition example, if the script was "1+2", the AdditionExpression would be constructed with a NumberExpression on the left and a NumberExpression on the right. These expressions were built from the Parser looking at the code and are responsible for interpreting themselves. But the AdditionExpression doesn't care if it's a NumberExpression, it just cares that it can resolve the values and add them together.

So if the user's script was now "ticket.order_value+ticket.children:purchase_certificate" then the left and right expressions will now be VariableExpressions, and when these resolve through a pulsar calculation will still be usable in the AdditionExpression without changing any code.

Working with the Parser

The parser is a set of classes architected to allow the building of Expression classes from a script. It is comprised of a grammar file and a set of Parser classes, grouped into SingularParsers and CollectionParsers.

Both Singular and Collection parsers will manipulate a Scanner, which is a class that is looking through the Pulsar script and recognizes tokens (defined in the Grammar file) (303). Singular Parsers are simply standalone Parsers that try to recognize a single token, like a NumberParser for instance will be looking for an integer like value. CollectionParsers look for sets of tokens, and are usually made up of SingularParsers to try and match a sequence. There are a few collection parsers that can act in different ways, which will be explained in the class definitions document.

To actually parse a script, the grammar file will do this. It will run the parsers in a defined order, and for each Parser that is run, if a match is found, it will use its paired Handler (there isn't always a Handler for each Parser), and this Handler is responsible for constructing the matched parsed string of tokens into an expression (304). These expressions are used by Pulsar to calculate the final return value of a Pulsar Formula.

FIG. 2-8 depicts the control flow of the invention

Different Parsers

Collection Parser—This is the base class for all collection parsers (201, 202, 203). It has an add method that allows the user to add a sub-parser for it to work on. It also has a term( ) function always set to false because this is stating whether it is a "Terminal" parser or not (506). Terminal essentially means it is parsing a single token, whereas this is not so Sequence Parser—

Sequence parsers (404) are the backbone of the entire pulsar parser (301-306). It essentially allows Pulsar, in succession, to look for everything it needs to look for and use individual handlers to turn those into Pulsar Object Code.

The underlying code for this actually makes it very easy to extend Pulsar to build new expressions for different things—since the entire Pulsar grammar is built up of a single sequence parse—consisting of many other parsers—it simply uses this to run through every possible thing it might be looking for in the code, one by one.

If the invention wanted to suddenly start looking for a new set of characters for instance that appended strings—say using 'ticket.name++ticket.created_by.name' instead of 'ticket.name & ticket.created_by.name', the invention would simply have to add a new sequence parser with two character parsers that included a ++ (407). As long as this is done after all the variables are resolved to expressions it can then make a handler which will build this into a concatenation expression, that will later be used in the bigger formula context.

Alternation Parser—

An alternation parser (401) lets the user group a bunch of different parsers together (402)—and it will run through each one of these parsers until it finds a match, and then parse that to its handler. This is particularly useful for operators—like+, >=, &, < > etc as they all have their own individual parsers that will live under a single alternation parser, and when the alternation parser matches any one of these, it is passed to the same handler as every other operator (403). This means adding non-arithmetic operators doesn't require any extra handling except for creating an expression that will handle the user's operation. (Arithmetic operators are still passed through an alternation parser, except they require a bit of extra work since BODMAS precedence needs to be accounted for—see Operator Precedence Parser)

Repetition Parser—

If the user ran an alternation parser by itself, it wouldn't be very useful because its purpose is to be able to pass multiple sets of tokens to its handler so these can be created into sets of expressions, but since parsers only run once, it would simply find the first one that matches, pass it to the handler and stop. This is where the repetition parser comes in.

A repetition parser will run all of its child parsers, over and over again until none of them are matching any more. For instance, as an alternation parser looks for different operators, each time one of its child parsers matches an operator, it takes that off of the scanner and creates an expression with it. It means this parser will no longer make a match for that operator, and eventually, once all the operator parsers have found the operators from the script and turned them into expressions, they will all fail to find a match. The repetition parser will then finally send a result back and its handler will be triggered, and all of these new expressions will be probably grouped to better represent what they do. For instance, if a concat expression was found, it will be integrated with its left and right expressions so it can actually perform the concat and interpret this for the rest of the script to use.

Operator Precedence Parser—

Pulsar formulas were designed to work in a strict fashion in terms of the interpreted order—it must follow BODMAS (Brackets, Orders, Division, Multiplication, Addition, Subtraction) which means from left to right is the priority of parsing and interpreting parts of the script. This was tricky to achieve however it has been achieved for arithmetic by use of the Operator Precedence parser.

This works by in the Pulsar Grammar assigning each character parser that works with numbers a precedence. These are then all placed into the operator precedence parser, which is placed in a repetition parser so it can be run multiple times until all the operators are parsed.

On each cycle, the operator parser only interprets and creates expressions for the parsers with the highest precedence. As the operator parser is repeated, higher precedence operators are popped off the scanner and eventually the lowest precedence operators are parsed and made into expressions.

This has the effect of placing these onto the context in an order which would make the highest precedence expressions get interpreted first by the interpreter, and this would mean other expressions that make use of the result in the bigger context will be interpreted against the correct values as per BODMAS Singular Parsers—

Figure 4:
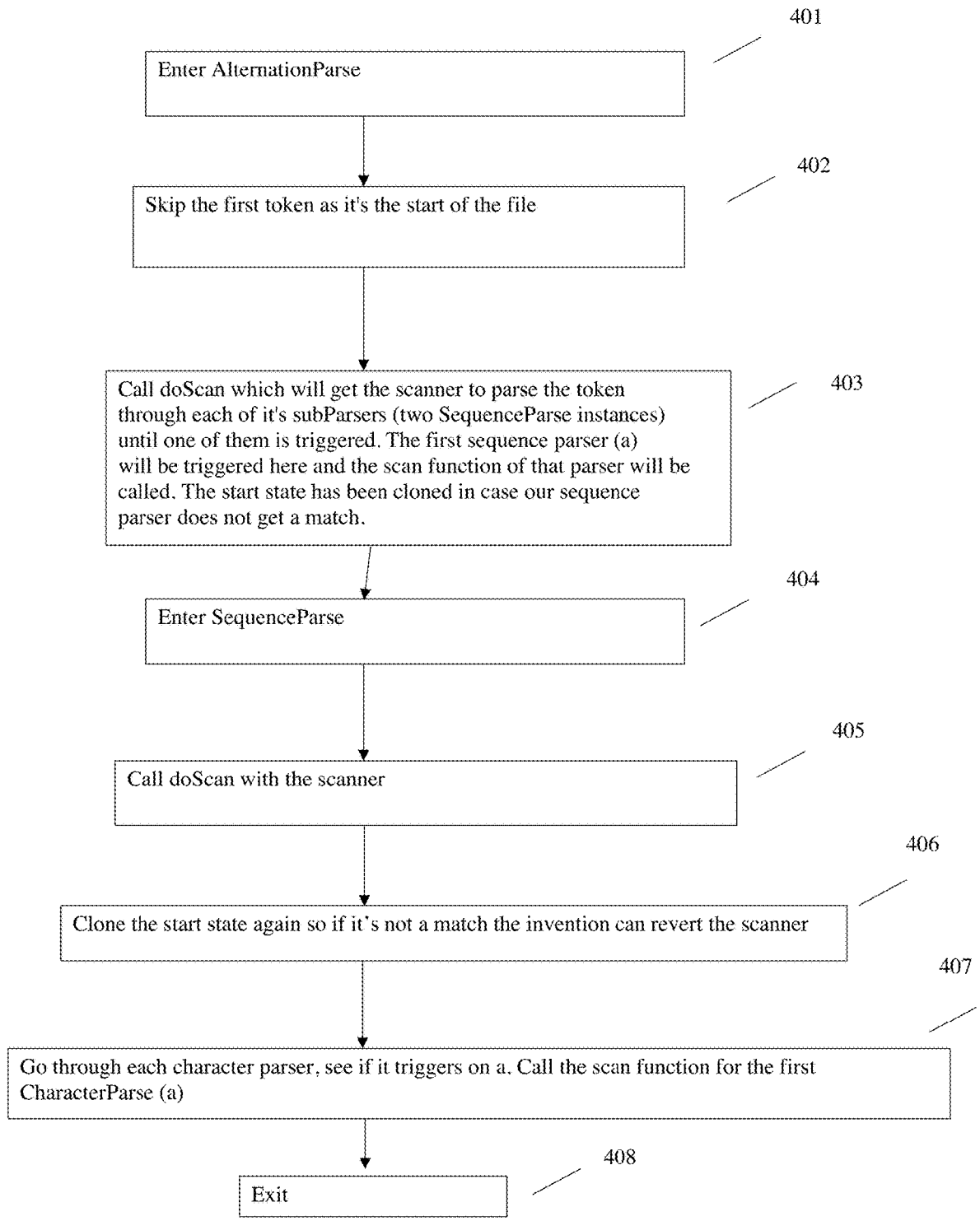
Figure 5:
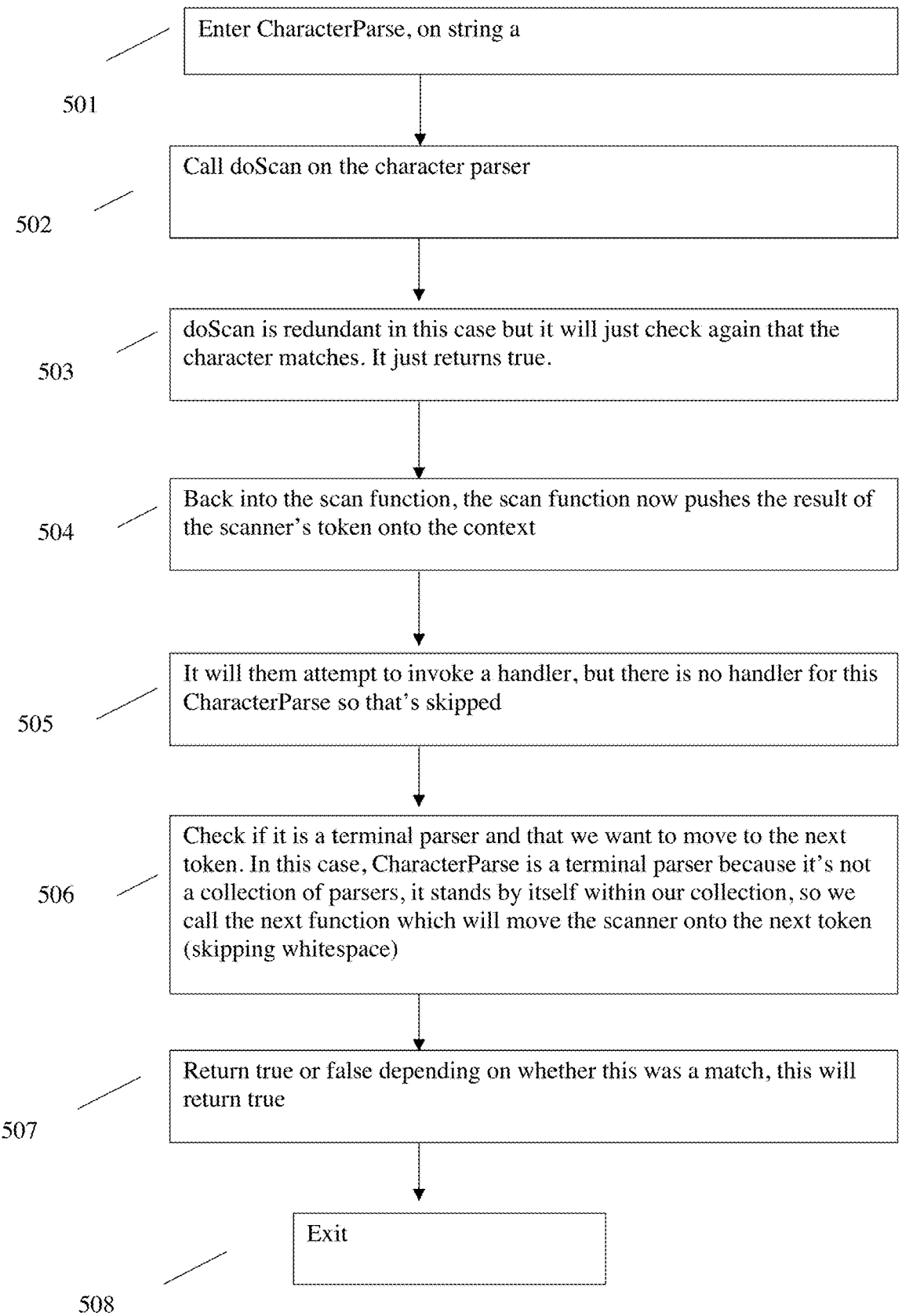
Figure 6:
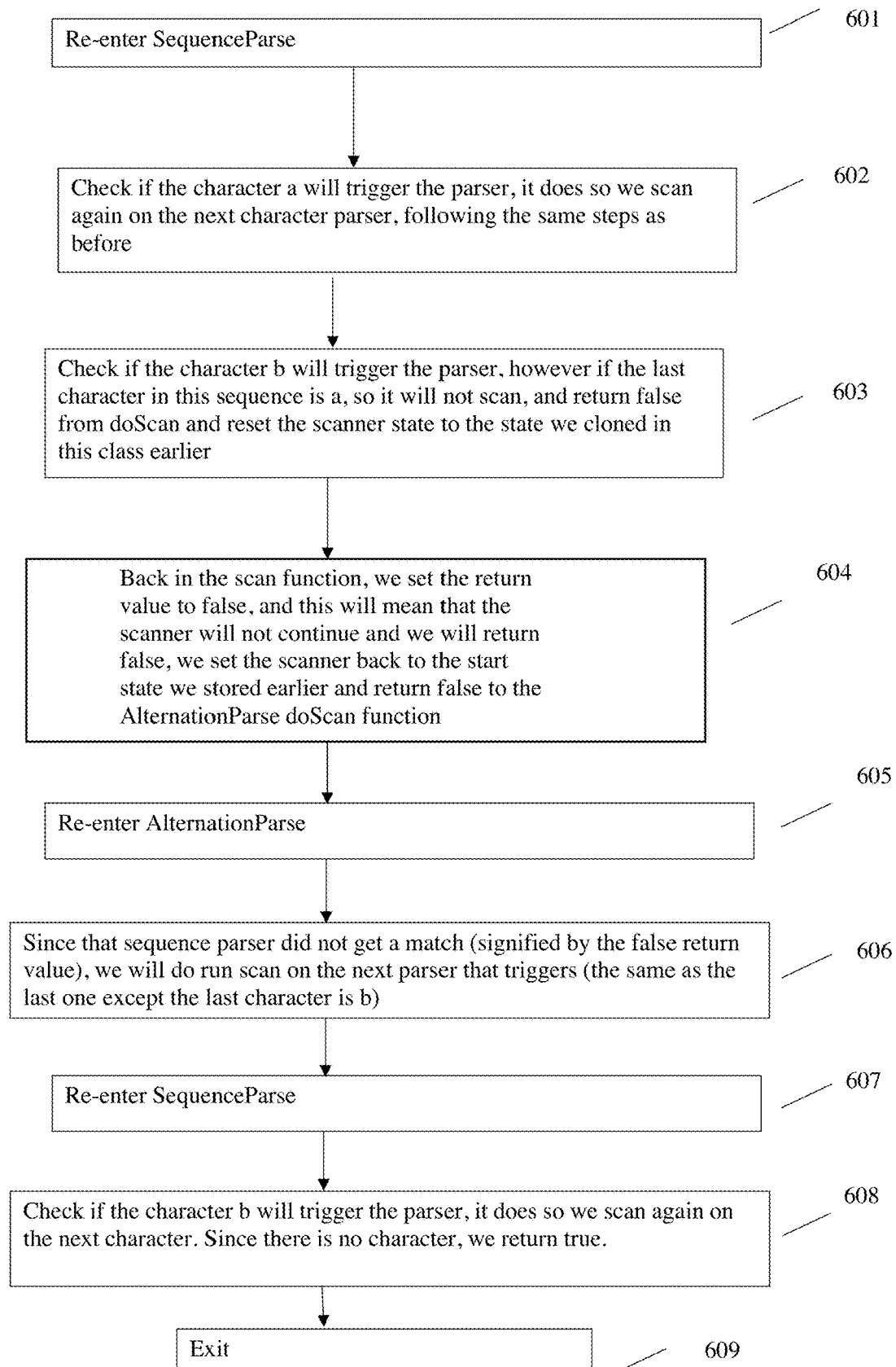
Figure 7:
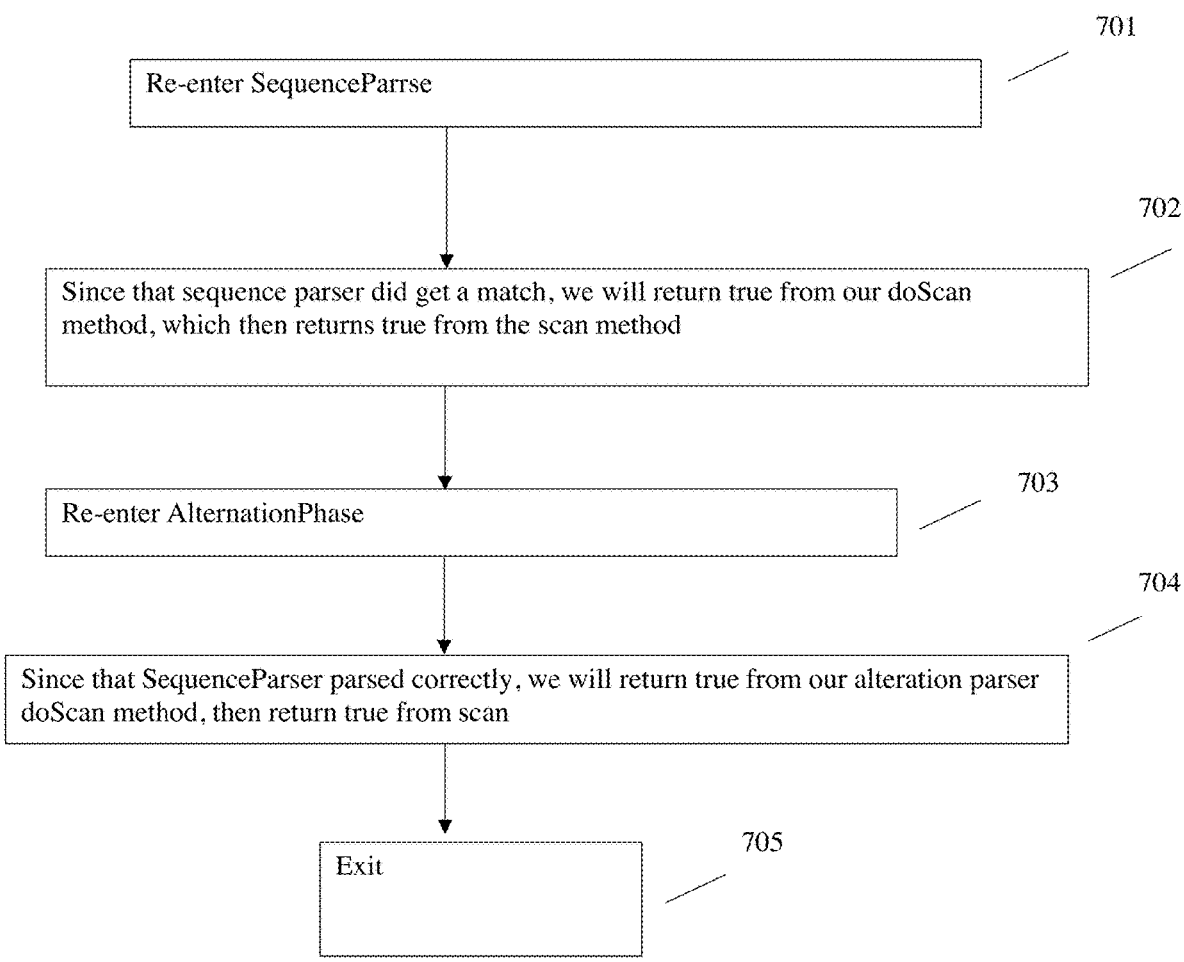
Figure 8:
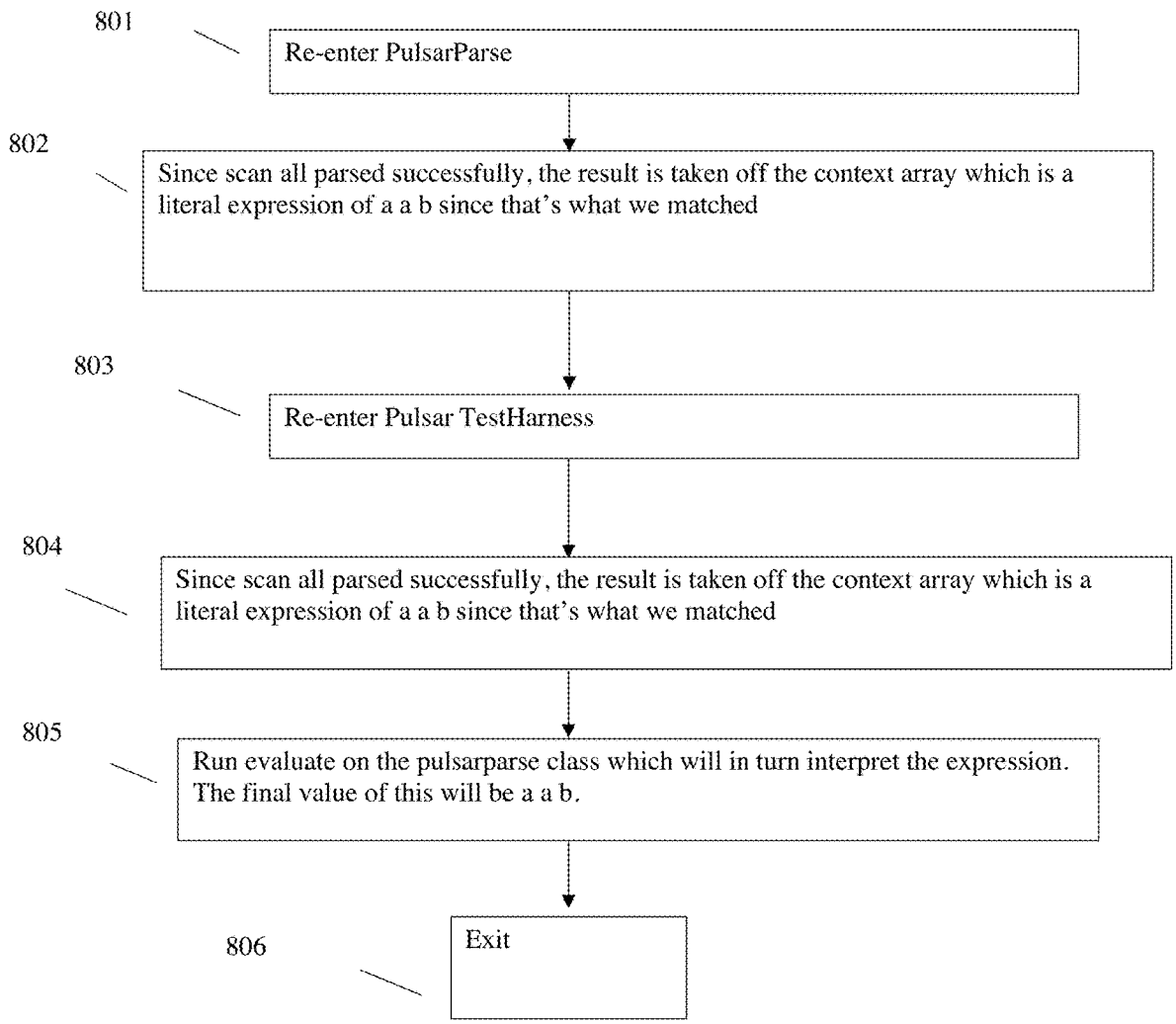

Singular parsers are made for parsing a single token and placing the value of that into an expression that can be interpreted. Whereas collection parsers will work on things like an entire scripts, functions (made up of singular expressions), arithmetic operators, singular parsers will work on one token at a time (a token being a single word, operator, character, etc) (FIG. 4). Singular parsers are the substance to collection parsers because they give the user the granular detail about the literal interpreted values that are being used in this script.

Interpreters

FQP Extraction

Figure 1:
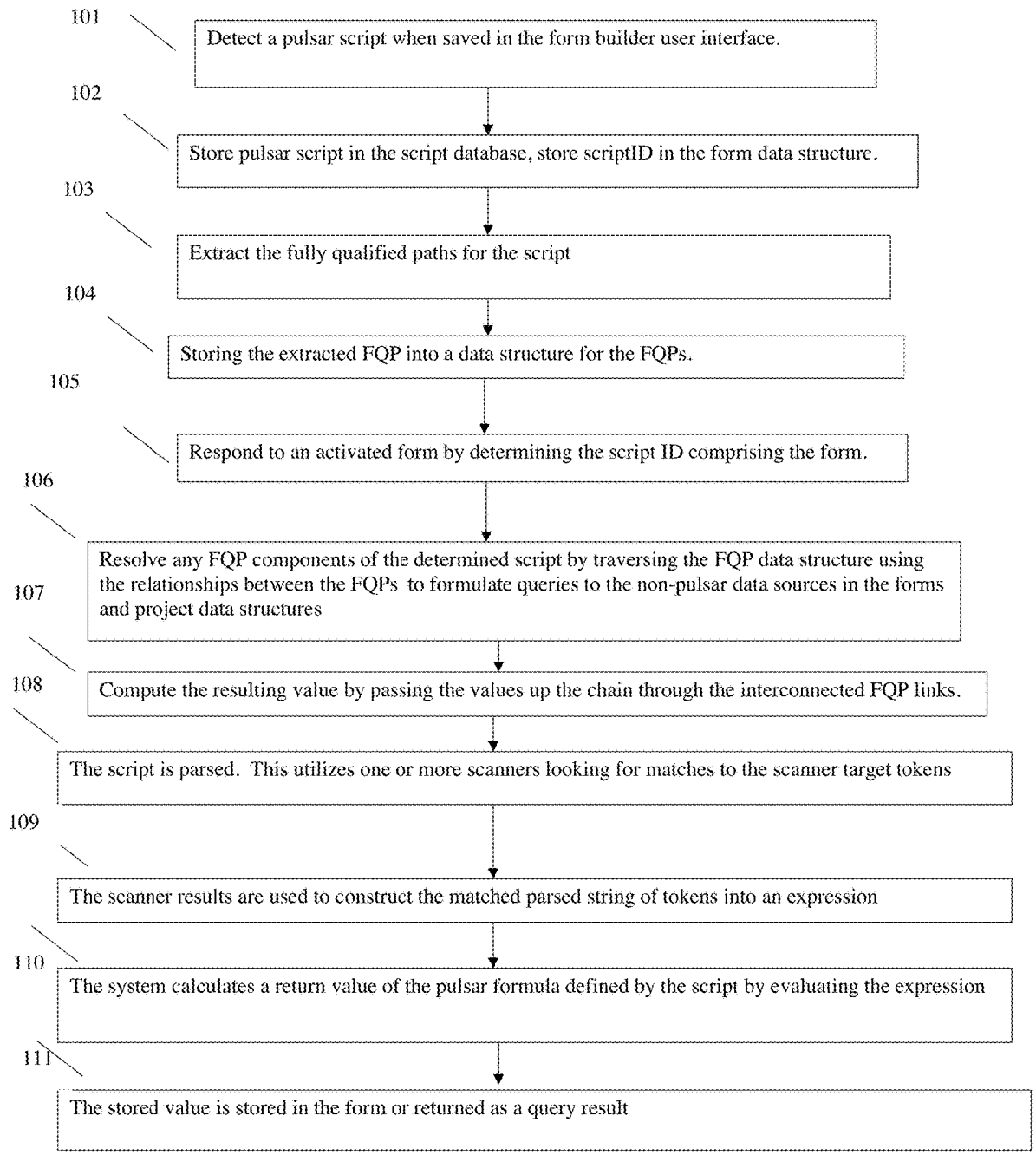
FIG. 1: Exemplary Flow Chart
Figure 2:
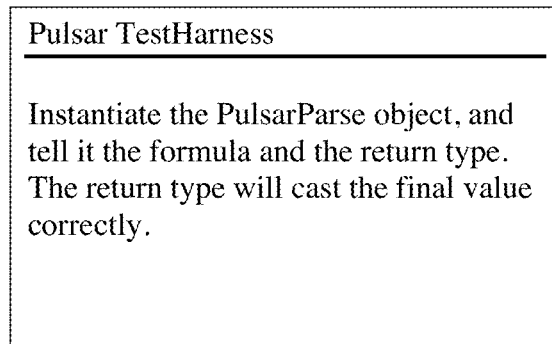
FIG. 2: Exemplary Lucid Chart of control flow of test GrammarFil with parserse
Figure 2:
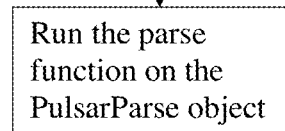
Figure 2:
Figure 3:
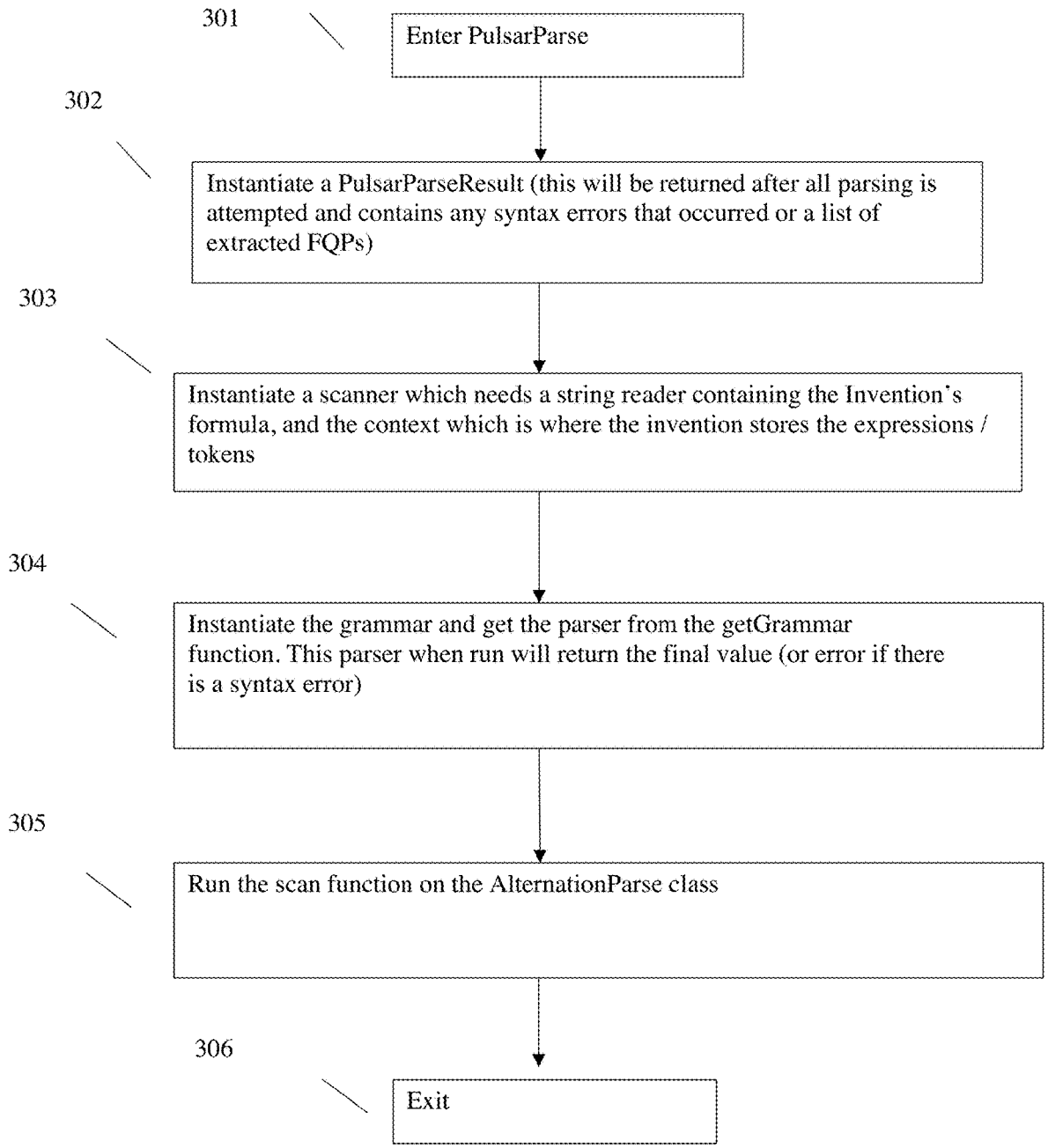
FIG. 3: Exemplary Lucid Chart of control flow of test GrammarFil with parserse
FIG. 4 Exemplary Lucid Chart of control flow of test GrammarFil with parserse
FIG. 5 Exemplary Lucid Chart of control flow of test GrammarFil with parserse
FIG. 6 Exemplary Lucid Chart of control flow of test GrammarFil with parserse
FIG. 7 Exemplary Lucid Chart of control flow of test GrammarFil with parserse
FIG. 8 Exemplary Lucid Chart of control flow of test GrammarFil with parserse
FIG. 9 Exemplary Database Schema
FIG. 10 Exemplary Data Object

A fully qualified path or "FQP" is a data field that is related to an object (FIG. 1).

An FQP is a fully qualified path, it relates to a specific field on an object. A fully qualified path is a data field that is related to an object. FQP Extraction is a database optimization method where the invention extracts all expressions which are FQPs and from that, programmatically determines how to optimize the invention's queries when the invention runs it on multiple records. When the invention extracts the FQPs, it has to store whether the FQP is referencing a Pulsar Formula or not.

All extracted FQPs live in the pulsar_script_fqps table

All extracted FQPs that reference an FQP which is a Pulsar Formula will live in the pulsar_script_fqp_references table, which stores the script ID of the one that is being referenced (pulsar_sub_script_id) plus the referencing script (pulsar_script_id).

For example, this script would have the below FQP rows stored:

SUM(ticket.parent:form_1.children:form_2, 'this.cert', {! item.status < > ticket.status})

| | FQP | | | |
|---|---|---|---|---|
| ID | FQP | FQP Type | Is Parent | Parent FQP |
| 1 | ticket.parent: form_1.children: form_2 | Non Pulsar | 1 | NULL |
| 2 | ticket.this_cert | Pulsar Formula | 0 | 1 |
| 3 | ticket.status | Non Pulsar | 0 | 1 |
| 4 | ticket.status | Non Pulsar | 0 | NULL |

| | FQP Reference | | | |
|---|---|---|---|---|
| ID | Sub FQP | FQP Type | Is Parent | Parent FQP |
| 1 | ticket.this_cert | Non Pulsar | 1 | NULL |

FQPs

In the code it refers to objects that contain fully qualified paths as "DataObjectDescriptor" and the process for defining these objects are contained within a "DataObjectDescriptorBuilder" The data object representing a data object descriptor will appear as the following:

FieldDescriptor

It's a class which contains an FQP and the instructions for SQL to get the data for this field. The class also contains descriptive information about the specific field, including the label and data type.

DataObjectDescriptor

Describes the fields the user can have on an object (i.e. all the static fields, custom fields and pulsar fields on a specific form)

There are many of these built up which as an entire structure act as an interface from FQPs to Objects in the system (i.e, there's one for Users defining the fields and object relations that it has and one for Tickets which is dynamic depending on the form the user specifies)

DataObjectGetter

Pass in the descriptor builder name and then the parameters it needs to build (i.e. the form ID for a TicketDescriptorBuilder) and this gets the data for the dataObjectGetterParams object specified ticket ID if it was a TicketDataObjectGetterParams BatchDataGetter The batch data getter is a class which resolves the value of an FQP at runtime for a Pulsar script. Since pulsar script expressions will sometimes be variables, these will need to be resolved and computed so their value can be used in other expressions. The batch data getter is responsible for getting this value.

To do this, it holds all of the queries it needs to run in order to get the values QueryRelationships on BatchQueryContext A QueryRelationship is just a query—that needs to be run to get some sort of FQP result. It's not always a "relationship", it's just a query but an FQP like "ticket.project.id" is a relationship as it uses the project relation.

Normal Fields (Static Fields)—StaticFieldBatchDataQuery

Used to retrieve standard fields from models, this class is responsible for resolving the database table for the FQP and then retrieving that record.

Custom Fields—CustomFieldBatchDataQuery

Responsible for retrieving custom field FQP values for the object. Ie, ticket.invoice_total is a custom field and will need to go through the CustomFieldBatchDataQuery Child Tickets—ManyRefBatchDataQuery The ManyRefBatchDataQuery is responsible for retrieving the related child tickets of the objects running the pulsar formula. It gets passed an array of form ids and record ids, from this it then returns all the child tickets that belong to any of those form ids and where the parent_ticket_id is within the record ids array. Finally it maps the child tickets to their parents This then allows the invention to run pulsar formulas that use a ManyRef based function. In the following example, the invention counts how many child tickets are created on the "line_items" form AVERAGE(tickets.children:risks)

Associate Tickets—AssociateTicketBatchDataQuery

Similar to the "ManyRefBatchDataQuery" but instead of querying for child tickets it instead queries for associated tickets. Child tickets can only have 1 parent, whilst associate tickets has a many-to-many relationship where it can be linked to many tickets.

By having this query, the invention is then able to run pulsar formulas that can use ManyRef based functions on the associated tickets. In the following example, the invention averages the "risk_score" field in the associated form called "risks"

AVERAGE(tickets.associated:risks, 'risk_score')

Project Form Tickets—ProjectFormBatchDataQuery

The ProjectFormBatchDataQuery is responsible for loading tickets that are created on the project, it takes an array of project record ids and also an array of form ids. The query then returns all the ticket ids that belong to the projects and forms.

This query is essential in allowing the invention to query tickets that are created on the project, all of this data can then be queried using functions that accept a ManyRef parameter. In the following example this will allow the invention to sum the "invoice_total" field in the "invoices" form of a project SUM(project.forms:invoices, 'invoice_total')

Or this could also be executed in the context of a ticket by using the following formula SUM(ticket.project.forms:invoices, 'invoice_total)

Pulsar Fields (Pulsar2Pulsar)

Because pulsar to pulsar requires a calculated value, extra work is required in order to get these values out to whoever requested them. It can do this using the FQPs that are extracted and saved in the database at parse level. It resolves these in the manner that it needs to in order to return the pulsar value at runtime when an expression is interpreted.

Pulsar Database Schema

Figure 9:
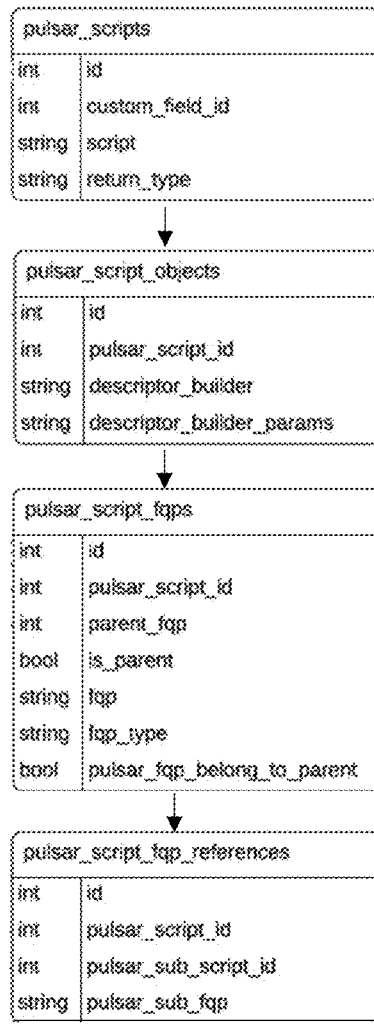

As further demonstrated in FIG. 9, the pulsar_scripts table is responsible for storing the actual pulsar script as a piece of text and also stores what custom field the script belongs to and what the expected return type of the script is. The following return types are accepted: Boolean, percentage, number, string, currency, date and variance.

The pulsar_scripts_objects table is responsible for storing what object the pulsar script should be executed against. Pulsar scripts can only be executed against forms and projects.

The pulsar_script_fqps table is responsible for storing extra details of the FQPs used in the pulsar script. This helps the pulsar engine determine whether the FQP belongs to another data source and whether it needs to load additional data.

The pulsar_script_fqp_references table stores the dependencies of other pulsar scripts that it requires in order to run. This allows the pulsar engine to run the required formulars before the source formula is executed.

Applicant passes a string of 'a a b' to our grammar to see if it parses correctly. The valid grammar is a sequence of standalone characters which are a, a and a or a, a and b, so it should technically parse correctly as it matches the second valid sequence Operation of Pulsar:

In operation, the system first uses the form builder to accept as input from a user a set of strings of alpha numeric text or selections of alpha numeric text strings that comprise the script for at least one pulsar. These strings are stored in the pulsar database. FIG. 9. When the system operates to move a form through a workflow, any pulsar referred to in the contents of the form will be executed. This is accomplished in several steps (FIG. 1).

1. detect a pulsar script when saved in the form builder user interface. (101)

2.1 store pulsar script in the script database, store scriptID in the form data structure. (102)

2, extract the fully qualified paths (FQP) for the script (103)

3, storing the extracted FQP into a data structure for the FQPs. (104)

4, respond to an activated form by determining the script ID comprising the form. (105)

5, resolve any FQP components of the determined script by traversing the FQP data structure using the relationships between the FQPs to formulate queries to the non-pulsar data sources in the forms and project data structures. (106)

6 compute the resulting value by passing the values up the chain through the interconnected FQP links. (107)

7 the script is parsed. This utilizes one or more scanners looking for matches to the scanner target tokens. (108)

8, the scanner results are used to construct the matched parsed string of tokens into an expression. (109)

9, the system calculates a return value of the pulsar formula defined by the script by evaluating the expression. (110)

10, the stored value is stored in the form or returned as a query result. (111).

The parsing of the scripts may be performed by a set of nested classes or procedure calls. At the top level, the PulsarParse class instantiates the object, takes the formula as input (201, 202)(801) and returns the value. (202). The PulsarParse class utilizes an instances of a scanner. (303). The scan function is run on the AlternationParse class (305). The AlternationParse class (401) operates in two parts. It utilizes a first SequenceParse (404, 405, 601, 701) instance to look for a first string a. (403, 702) To do this, it calls the scan function for the first CharacterParse(a). (406, 407)(501) (602). The CharacterParse checks (502) to see if it is a terminal parse (503, 504) and moves to the next token, or return true or false depending on a token match (507)(603, 604, 703) At this point, the SequenceParse is called again but the last character is b (508). (606). The parser checks of the character b triggers, and if so, then the scan is repeated on the next character (506)(605-609). If there is no next character, the function returns a logical value true. (608). At this point, the hierarchical layers of object classes gets unwound to return "TRUE". (704, 705)(507). The result is taken off the context array, which is a literal express of aab, which was the match. (802, 803-806). At this point the top level class evaluates the class that is comprised of the expression (508).

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, handheld computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method executed by a computer system for automatic processing of form data structures comprising a project data structure defined by the form data structures, the method comprising:
    executing a form builder process to generate and store a form data structure in a computer data storage device;
    receiving input to the form builder process comprised of data representing a script;
    storing the received script in a script database record comprising a script database;
    automatically extracting an at least one Fully-Qualified Path (FQP) from the data representing the script said at least one FQP comprised of a corresponding script identifier and a corresponding reference to a data query specification, said data query specification defining how to obtain a location of a corresponding data object from a predetermined database;
    storing the at least one extracted FQP in a Fully-Qualified Path (FQP) data structure;
    receiving data representing an input script;
    determining by parsing the input script the presence of at least one reference to an FQP comprising the input script;
    using the at least one determined FQP reference and the FQP data structure to determine a corresponding at least one query specification;
    using the at least one determined query specification to generate a corresponding at least one query;
    using the at least one generated query and the predetermined database to obtain a query result return value corresponding at least one data object reference corresponding to the at least one determined FQP;
    generating a revised input script by replacing the at least one determined FQP comprising the input script with a corresponding data comprising the at least one obtained data object referred to by the corresponding at least one data object reference; and
    executing the revised input script.

2. The method of claim 1 further comprising:
    automatically activating the stored script by selecting a script from the script database by matching a script identifier with a script identifier comprising the data record comprised of the stored script.

3. The method of claim 1 further comprising:
    automatically obtaining the query result—return value—by passing the query result return values through an at least one designated relationship between corresponding at least two Fully-Qualified Path (FQP) entries in the FQP data structure.

4. The method of claim 1 where the determining by parsing step is comprised of using at least one scanner to detect an at least one alphanumeric text data within the input script that matches an at least one pre-existing scanner target tokens corresponding to the at least one scanner.

5. The method of claim 4 further comprising:
    constructing an expression from the matched at least one scanner target tokens.

6. The method of claim 5 further comprising calculating a return value of the script by evaluating the expression.

7. The method of claim 1 further comprising:
    storing the at least one query result value in the corresponding form data structure.

8. The method of claim 1 further comprising:
    passing the at least one query result value to a computer process as part of a query result.

9. A computer system for automatic processing of form data structures comprising a project data structure defined by the form data structures, said system comprised computer memory comprised of program data that when executed causes the computer system to:
    execute a form builder process to generate and store a form data structure in a computer data storage device;
    receive input to the form builder process comprised of data representing a script;
    store the received script in a script database record comprising a script,
    automatically extract an at least one Fully-Qualified Path (FQP) from the data representing the script said at least one FQP comprised of a corresponding script identifier and a corresponding reference to a data query specification, said data query specification defining how to obtain a location of a corresponding data object from a predetermined database;

store the at least one extracted FQP in a Fully-Qualified Path (FQP) data structure;

receive data representing an input script;

determine by parsing the input script at least one reference to an FQP comprising the input script;

use the at least one determined FQP reference and the FQP data structure to determine a corresponding at least one query specification;

use the at least one determined query specification to generate a corresponding at least one query;

use the at least one generated query and the predetermined database to obtain a query result return value corresponding at least one data object reference corresponding to the at least one determined FQP;

generate a revised input script by replacing the at least one determined FQP comprising the input script with a corresponding data comprising the at least one obtained data object referred to by the corresponding at least one data object reference; and execute the revised input script.

10. The system of claim 9 where the computer program data further causes the computer to:

automatically activate the stored script by selecting a script from the script database by matching a script identifier with a script identifier comprising the data record comprised of the stored script.

11. The system of claim 9 where the computer program data further causes the computer to:

automatically obtain the query result—return value by passing the query result return values through an at least one designated relationship between corresponding at least two Fully-Qualified Path (FQP) entries in the FQP data structure.

12. The system of claim 9 where the computer program data further causes the computer to determine by parsing the script by using at least one scanner to detect an at least one alphanumeric text data within the input script that matches an at least one pre-existing scanner target tokens corresponding to the at least one scanner.

13. The system of claim 12 where the computer program data further causes the computer to:

construct an expression from the matched at least one scanner target tokens.

14. The system of claim 13 where the computer program data further causes the computer to calculate a return value of the script by evaluating the expression.

15. The system of claim 9 where the computer program data further causes the computer to:

store the at least one query result value in the corresponding form data structure.

16. The system of claim 9 where the computer program data further causes the computer to pass the at least one query result value to a computer process as part of a query result.

\* \* \* \* \*